United States Patent
Chameroy et al.

(10) Patent No.: US 10,076,206 B2
(45) Date of Patent: Sep. 18, 2018

(54) BAYONET FITTING PRESSURE COOKER PROVIDED WITH A CONTROL MEMBER

(71) Applicant: SEB S.A., Ecully (FR)

(72) Inventors: Eric Chameroy, Veronnes (FR); Daniel Jean Marie Anota, Dijon (FR); Philippe Roussard, Le Noyer (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/172,054

(22) Filed: Jun. 2, 2016

(65) Prior Publication Data
US 2016/0353916 A1   Dec. 8, 2016

(30) Foreign Application Priority Data

Jun. 2, 2015 (FR) ..................................... 15 54999

(51) Int. Cl.
*A47J 27/08* (2006.01)
*A47J 27/09* (2006.01)

(52) U.S. Cl.
CPC ....... *A47J 27/0806* (2013.01); *A47J 27/0804* (2013.01); *A47J 27/0815* (2013.01); *A47J 27/09* (2013.01)

(58) Field of Classification Search
CPC .............. A47J 27/0817; A47J 27/0806; A47J 27/0804; A47J 27/0808; A47J 27/0815
USPC ........... 99/337; 219/440, 431; 220/316, 315, 220/293
See application file for complete search history.

(56) References Cited

U.S. PATENT DOCUMENTS

| 2,583,085 | A | * | 1/1952 | Campbell | ............... B29C 33/48 |
| | | | | | 220/260 |
| 2,600,703 | A | | 6/1952 | Strom | |
| 2,660,330 | A | | 11/1953 | Keller | |
| 3,876,385 | A | * | 4/1975 | Markus | ...................... B01J 3/03 |
| | | | | | 220/316 |

(Continued)

FOREIGN PATENT DOCUMENTS

BR    8601076 A    10/1987
CH    571335 A5    1/1976

(Continued)

OTHER PUBLICATIONS

Search Report and Written Opinion issued by Institut National de la Propriété Industrielle, for French Patent Application No. 1552579, dated Feb. 2, 2016, 8 pages.

(Continued)

*Primary Examiner* — Reginald L Alexander
(74) *Attorney, Agent, or Firm* — Loeb & Loeb LLP

(57) ABSTRACT

The invention provides a cooking utensil for cooking food under pressure including a vessel, a lid, and a bayonet-fitting locking system, said utensil including a lid subassembly that includes both said lid and a support attached to said lid in such a manner that said lid can pivot, said utensil including a control member for controlling the locking/unlocking, and a transformation device for transforming the movement of the control member into pivoting of the lid relative to the support, said control member being shaped to be capable of being taken hold of manually and being connected mechanically to the support so that said lid subassembly being lifted manually, via the control member, causes the control member to be urged back into its unlocking position.

16 Claims, 7 Drawing Sheets

(56) References Cited

U.S. PATENT DOCUMENTS

| | | | |
|---|---|---|---|
| 5,768,976 A * | 6/1998 | Suk | A47J 27/0804 220/293 |
| 6,425,320 B1 * | 7/2002 | Chameroy | A47J 27/0806 126/373.1 |

FOREIGN PATENT DOCUMENTS

| | | |
|---|---|---|
| CH | 694356 A5 | 12/2004 |
| CN | 2389593 Y | 8/2000 |
| CN | 2469839 Y | 1/2002 |
| CN | 201624512 U | 11/2010 |
| CN | 203000535 U | 6/2013 |
| CN | 102349791 B | 4/2014 |
| EP | 2258243 A1 | 12/2010 |
| EP | 2732736 A1 | 5/2014 |
| FR | 2783687 A1 | 3/2000 |
| GB | 657982 A | 10/1951 |
| WO | 0143605 A1 | 6/2001 |
| WO | 2013039332 A2 | 3/2013 |

OTHER PUBLICATIONS

Search Report and Written Opinion issued by Institut National de la Propriété Industrielle, for French Patent Application No. 1554997, dated Mar. 31, 2016, 6 pages.

Search Report and Written Opinion issued by Institut National de la Propriété Industrielle, for French Patent Application No. 1555000, dated Mar. 22, 2016, 6 pages.

Search Report and Written Opinion issued by Institut National de la Propriété Industrielle, for French Patent Application No. 1555001, dated Mar. 22, 2016, 6 pages.

Search Report and Written Opinion issued by Institut National de la Propriété Industrielle, for French Patent Application No. 1554999, dated Mar. 22, 2016, 6 pages.

* cited by examiner

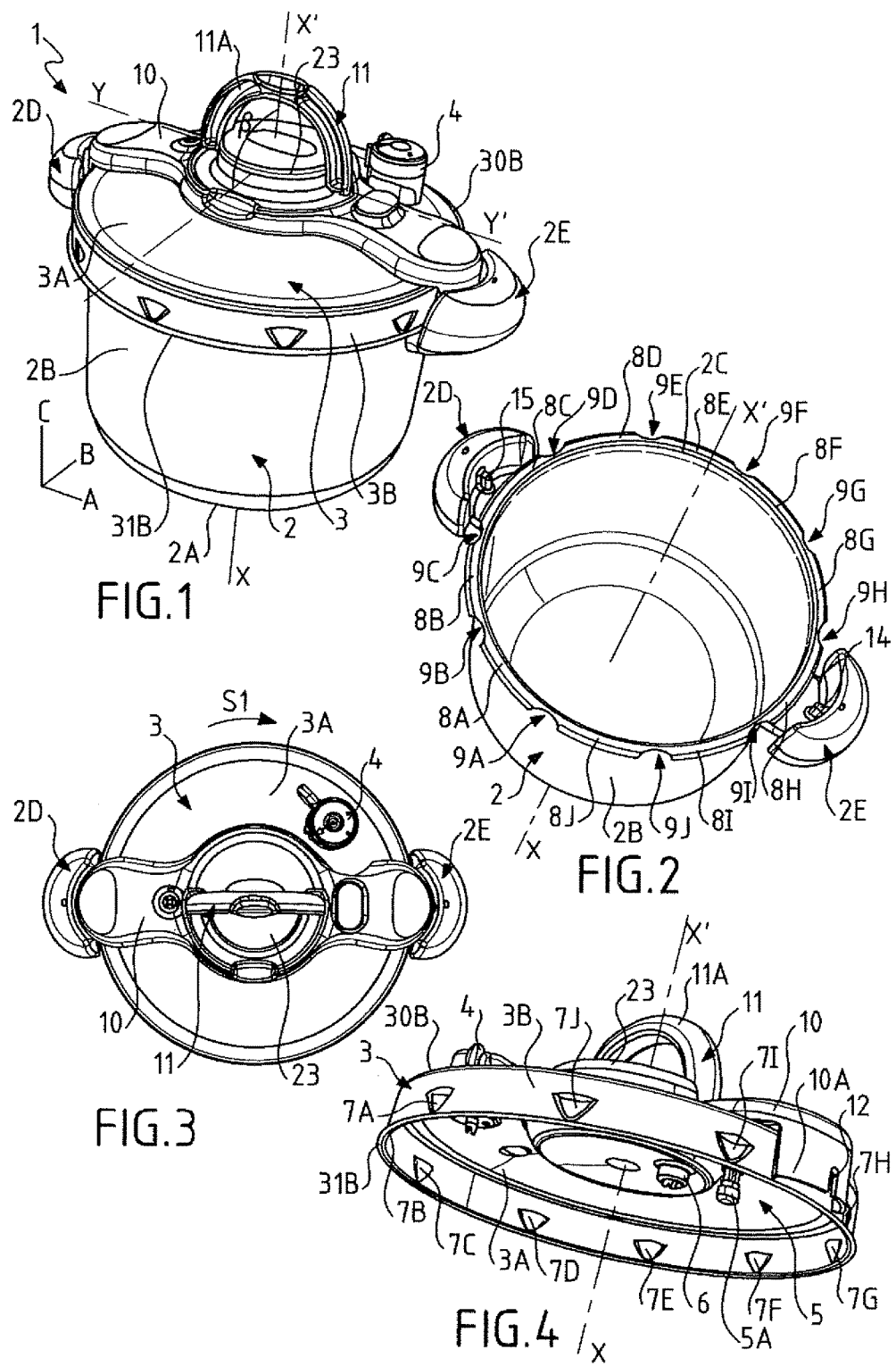

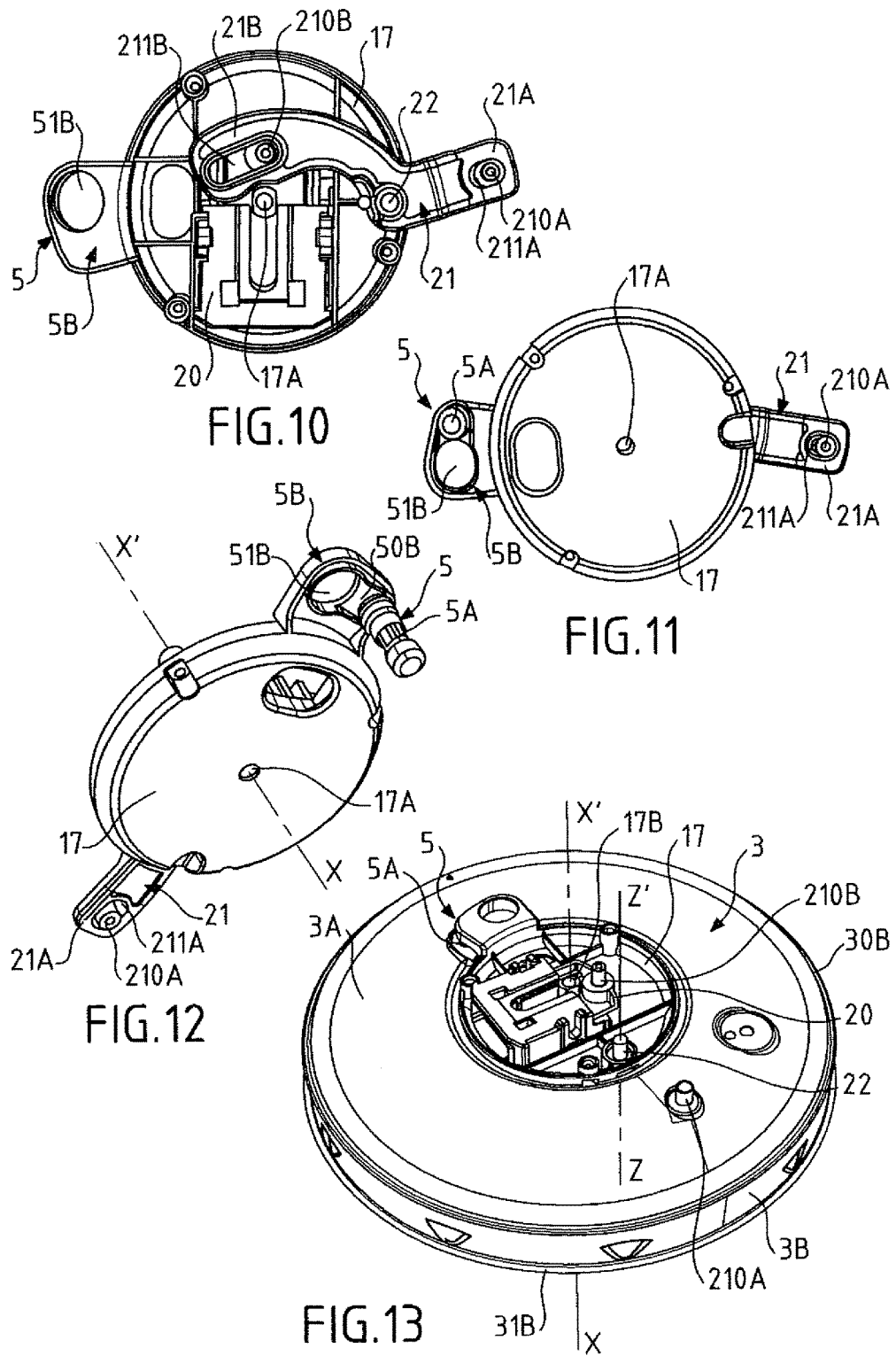

BAYONET FITTING PRESSURE COOKER PROVIDED WITH A CONTROL MEMBER

CROSS-REFERENCES TO RELATED APPLICATIONS

This application claims priority to, and the benefit of, French Patent Application No. FR-15 54999, filed Jun. 2, 2015, entitled "A Bayonet Fitting Pressure Cooker Provided With A Control Member," the entire contents of which is incorporated herein by reference.

BACKGROUND

The present invention relates to the general technical field of utensils for cooking food under pressure, and in particular to household utensils of the pressure cooker type that are designed to form cooking enclosures capable of allowing pressure to build up in them so as to cook food contained in them under steam pressure.

SUMMARY OF THE INVENTION

The present invention relates more particularly to a cooking utensil for cooking food under pressure that has a vessel, a lid, and a bayonet-fitting locking system.

Cooking utensils for cooking food under pressure, in particular for household use, are well known. They generally comprise a metal vessel onto which a lid that is also made of metal is designed to be mounted in sealed manner, via a flexible annular seal, in such manner as to constitute a cooking enclosure capable of allowing pressure to build up in it. The lid is designed to be coupled to the vessel via locking means enabling the pressure cooker to go between a locked configuration, in which the lid is locked relative to the vessel, and in which the cooking enclosure is capable of allowing pressure to build up in it, and an unlocked configuration, in which the lid can be freely separated from the vessel. Different types of locking means are well known in the prior art. One of the systems that are in most widespread use is the locking system having bayonet fittings, that system being based on implementing vessel and lid ramps that are designed to come into mutual sliding abutment once the lid has been turned so as to provide a retaining mechanical coupling that prevents the vessel and the olid from coming apart under the effect of the build-up of pressure. The lid ramps are conventionally formed by locally and inwardly folding over the annular dropped edge of the lid, while the vessel ramps are obtained by folding over and cutting out the free top edge of the vessel.

Such a locking system having bayonet fittings is generally satisfactory, in particular because it is relatively light in weight, it is simple to manufacture, and it is reliable.

However, it also suffers from certain significant drawbacks, in particular in terms of practicality and ergonomics.

Firstly, the very principle of locking by bayonet fittings requires the user to place the lid on the vessel in a precise and specific arrangement enabling the lid ramps to pass through cutouts provided in the top edge of the vessel, so that they find themselves below the vessel ramps, in a ready-for-locking position, from which position the user can then bring the lid and vessel ramps into locking correspondence, by turning the lid on the vessel. In practice it is often awkward and not ergonomic to position the lid on the vessel in the above-mentioned precise and specific arrangement. In addition, once the lid is in the ready-for-locking position, the user must then exert on the lid a significant force for turning it in a predetermined direction, which is not necessarily intuitive, possibly combined with exerting a downward pressure on the lid. Such locking manipulation is not only unintuitive and awkward but also requires a certain amount of physical strength, in particular because of the friction at the seal interposed between the lid and the vessel. In practice, locking a bayonet-fitting pressure cooker thus requires the lid to be mounted correctly onto the vessel, for which several attempts are frequently needed, and then requires the pressure cooker to be taken hold of with both hands, in such a manner as to hold the vessel stationary with one hand and to exert a force with the other hand for turning the lid relative to the vessel, while also exerting a downward pressure on the lid, until the locking configuration is reached. From this point of view, bayonet-fitting pressure cookers are generally much less easy and much less practical to use than, for example, pressure cookers having jaws, but such pressure cookers having jaws are much heavier than bayonet-fitting pressure cookers, and generally cost much more to manufacture.

The invention therefore proposes to remedy the various drawbacks described above, and to propose a novel cooking utensil for cooking food under pressure that is particularly lightweight, safe, and quick and inexpensive to manufacture, while also being particularly ergonomic and easy to use, in particular with one hand only.

Another object of the invention is to propose a novel cooking utensil for cooking food under pressure that is particularly simple and reliable to lock.

Another object of the invention is to propose a novel cooking utensil for cooking food under pressure that, in natural and intuitive manner, is highly suggestive as to how it should be used.

Another object of the invention is to propose a novel cooking utensil for cooking food under pressure that procures a high level of safety while it is being used.

Another object of the invention is to propose a novel cooking utensil for cooking food under pressure that is of design that makes it completely unnecessary for the user manually to hold the vessel stationary while the user is locking the lid relative to the vessel.

Another object of the invention is to propose a novel cooking utensil for cooking food under pressure that implements a locking control mechanism that is particularly robust and compact.

Another object of the invention is to propose a novel cooking utensil for cooking food under pressure that is of design making it possible to minimize the manual force exerted by a user in order to cause the locking to take place.

Another object of the invention is to propose a novel cooking utensil for cooking food under pressure that has a locking control mechanism that is particularly simple, lightweight, and reliable.

Another object of the invention is to propose a novel cooking utensil for cooking food under pressure that is provided with a control member that makes it particularly intuitive to perform both locking and unlocking.

Another object of the invention is to propose a novel cooking utensil for cooking food under pressure that is easy and practical to stow and to wash in a dish washer.

Another object of the invention is to propose a novel cooking utensil for cooking food under pressure that considerably limits the risk of a user lifting the entire utensil by the lid.

Another object of the invention is to propose a novel cooking utensil for cooking food under pressure that is particularly ergonomic and that limits the risk of the user letting go of the lid.

The objects assigned to the invention are achieved by means of a cooking utensil for cooking food under pressure including a vessel, a lid, and a bayonet-fitting locking system, said utensil being characterized in that it includes a lid subassembly that includes both said lid and a support attached to said lid in such a manner that said lid can pivot relative to said support between two positions corresponding respectively to an unlocking configuration and to a locking configuration of said lid subassembly, the lid subassembly in the unlocking configuration and the vessel being designed to be united in at least one predetermined relative arrangement enabling said bayonet-fitting locking system to lock the lid to the vessel by the lid being pivoted in order to cause the lid subassembly to go from its unlocking configuration to its locking configuration, said utensil including a control member for controlling the locking/unlocking, which member is attached to said support in such a manner as to be movable relative to said support between a locking position and an unlocking position, said utensil including a transformation device for transforming the movement of the control member into pivoting of the lid relative to the support so that said locking and unlocking positions correspond respectively to said locking and unlocking configurations, said control member being shaped to be capable of being taken hold of manually in order to enable the lid subassembly to be manipulated via it, said control member being connected mechanically to the support so that said lid subassembly being lifted manually, via the control member, against the weight of said lid subassembly, causes the control member to be urged back into its unlocking position under the effect of said weight of the lid subassembly.

Other features and advantages of the invention appear and can be seen in more detail on reading the following description with reference to the accompanying drawings, given merely by way of non-limiting illustration, and in which:

BRIEF DESCRIPTION OF THE DRAWINGS

FIG. 1 is a diagrammatic perspective view of a cooking utensil of the invention for cooking food under pressure having bayonet-fitting locking, in which utensil the lid subassembly is in the unlocking configuration and is united with the vessel in the predetermined relative arrangement (pre-locking arrangement) enabling locking to take place by the lid being turned, said relative arrangement corresponding to a ready-for-locking configuration of the utensil, in which the control member for controlling locking/unlocking is in a deployed position corresponding to the lid being unlocked relative to the vessel;

FIG. 2 is a diagrammatic perspective view from above of the vessel of the pressure cooker of FIG. 1, said vessel being, in this example, provided with two side handles enabling it to be manipulated and transported manually;

FIG. 3 is a view from above of the pressure cooker of FIG. 1;

FIG. 4 shows the lid subassembly in an unlocking configuration, ready to come and fit over the top of the vessel of FIG. 2 in the pre-locking predetermined relative arrangement shown in FIG. 1;

FIG. 10 is a view from above of the embodiment detail of FIG. 9, except that the control member has been omitted;

FIG. 11 is a view from below of the embodiment detail of FIG. 10;

FIG. 12 is a perspective view from below of the embodiment detail of FIGS. 10 and 11;

FIG. 13 shows the lid of the pressure cooker of FIGS. 1 to 12, on which lid there are mounted some of the parts forming the support, as well as the transformation device for transforming the manual movement of the control member into pivoting of the lid relative to the support;

DETAILED DESCRIPTION

Figure 5:
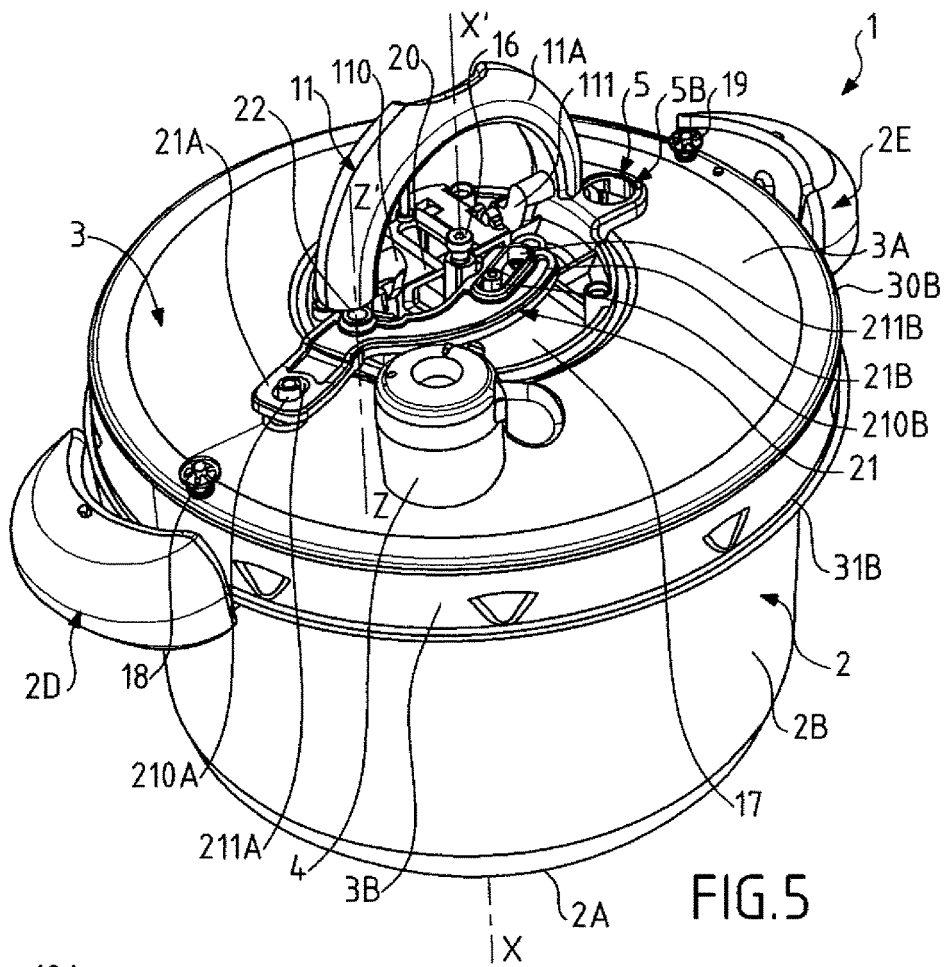
FIG. 5 shows the pressure cooker of FIGS. 1 to 4, the support not being shown in order to make it possible to see a movement-transformation device for transforming the manual movement of the control member into pivoting of the lid relative to the support.

As shown in the figures, the invention relates to a cooking utensil 1 for cooking food under pressure, which utensil is designed to cook a variety of food under a level of pressure greater than atmospheric pressure, in the presence of vapor, e.g. steam. Said vapor or steam is generated by a cooking liquid, e.g. an aqueous liquid, being heated inside the utensil 1 in the presence of the food. The utensil 1 of the invention is preferably designed for household use, but it should be understood that the invention may also relate to professional or semi-professional utensils. The utensil 1 of the invention is designed to allow pressure to build up exclusively under the effect of a heat source (which may be incorporated or external), without any external pressure being supplied. The cooking utensil 1 for cooking food under pressure therefore constitutes a pressure cooker that is preferably designed to be placed on an independent hotplate or ring for heating the contents. The cooking apparatus 1 of the invention includes at least one vessel 2 forming a cooking receptacle designed to receive the food to be cooked and, in this example, being substantially circularly symmetrical about a central vertical axis X-X', which extends in a direction that is similar to the vertical direction when the utensil 1 is operating normally, i.e. when it is resting on a horizontal plane. In conventional manner, the vessel 2 is manufactured from a metal material, such as stainless steel or aluminum. The vessel 2 includes a bottom 2A that is, for example, a multi-layer, heat-conductive bottom. The vessel 2 also includes an annular side wall 2B that extends upwards between said bottom 2A and a free top edge 2C, which, in this example, is of circular shape, and which defines an access opening that gives access to the inside of the vessel 2. The shaping of the free top edge 2C is described in more detail below, in relation to the locking means of the utensil 1. Advantageously, and as shown in the figures, the cooking utensil 1 is provided with at least one vessel handle 2D that is fastened to said vessel 2, in such a manner as to project outwards from said vessel. In the embodiment shown in the figures, said vessel handle 2D is mounted on the outside face of the side wall 2B of the vessel 2, in such a manner as to extend radially outwards from the vessel 2 and thus to form graspable means designed to be taken hold of manually by the user in order to manipulate the vessel 2 (e.g. to lift it and to move it). In the embodiment shown in the figures, the cooking utensil 1 has two identical handles 2D, 2E fastened to the side wall 2B of the vessel 2 in diametrically opposite manner about the central axis X-X', said vessel handles 2D, 2E being, in this example, disposed in the vicinity of the free top edge 2C of the vessel 2. However, it is quite possible for the vessel 2 to be provided with a single vessel handle, or with more than two vessel handles (e.g. three or four), without going beyond the ambit of the invention.

The utensil 1 of the invention also includes a lid 3 designed to be associated with the vessel 2 and to be locked relative to said vessel 2 to form a cooking enclosure suitable for allowing pressure to build up in it, i.e. a cooking enclosure that is sufficiently hermetically sealed to allow the pressure of the utensil 1 to build up. In order to obtain such leaktight, hermetic sealing, the utensil 1 advantageously includes a seal (not shown), preferably formed by a flexible annular gasket, made of elastomer, for example, and designed to be interposed between the lid 3 and the vessel 2, thereby preventing any uncontrolled leak of steam and/or of air between the inside of the enclosure and the outside. In conventional manner, the lid 3 is manufactured from a metal material, such as stainless steel or aluminum. It advantageously has a shape that is complementary to the shape of the vessel 2, e.g. substantially disk-shaped, and that advantageously extends in a mean plane that is substantially parallel to the mean plane in which the bottom 2A of the vessel 2 extends (i.e. a plane that is substantially horizontal in this example) once it is mounted and locked on said vessel. In the embodiment shown in the figures, the lid 3 includes a disk-shaped lid element 3A of shape and dimensions complementary to the shape and dimensions of the access opening delimited by the free top edge 2C of the annular side wall 2B of the vessel 2. In this embodiment, the lid 3 advantageously includes an annular band 3B, e.g. of substantially cylindrical or frustoconical shape, extending between a first circular edge 30B that is integral with the disk-shaped lid element 3A (in this example, at the periphery thereof), and a free second circular edge 31B, which is, for example, itself extended by an end flange. As shown in the figures, the disk-shaped lid element 3A extends substantially in a horizontal mean plane, i.e., in this example, a mean plane parallel to the mean extension plane of the bottom 2A of the vessel 2 when the lid 3 is associated with the vessel 2 to form the cooking enclosure, while the annular band 3B extends substantially vertically, i.e. parallel to the central axis X-X', the end flange extending substantially horizontally. Naturally, this in no way excludes the possibility of the disk-shaped lid 3A being, as shown in the figures, slightly domed or dished locally, e.g. to accommodate a control mechanism. In the embodiment shown in the figures, the annular band 3B is formed by a dropped edge that extends downwards from the periphery of the disk-shaped lid element 3A. In this embodiment, the lid 3 is designed to come to fit over the top of the vessel 2 in substantially snug manner, so that the annular band 3B externally surrounds the top of the annular side wall 2B and the free top edge 2C, while the disk-shaped lid element 3A rests on and bears against the free edge 2C via the sealing gasket interposed between the vessel 2 and the lid 3. However, it is quite possible, alternatively, for the annular band 3B to be designed to fit into the vessel 2 so as to be surrounded by and contained in the vessel 2, without going beyond the ambit of the invention.

The cooking utensil 1 of the invention for cooking food under pressure advantageously includes pressure regulation means 4, such as, for example, a valve, preferably mounted on the lid 3, e.g. in such a manner as to be carried directly by said lid 3, and arranged to maintain the pressure prevailing in the cooking enclosure at a substantially constant predetermined value referred to as the "operating pressure", which value exceeds atmospheric pressure by a value that, for example, lies substantially in the range 10 kilopascals (kPa) to 120 kPa, and is preferably about 100 kPa. The general operating principle of such pressure regulation means is well known per se, so that it is not necessary to describe it in any further detail below. The cooking utensil 1 for cooking food under pressure may include other operating members (e.g. opening safety means 5 that are described in more detail below, an overpressure safety valve 6, etc.). The vessel 2 and the lid 3 thus constitute complementary respective casings that are preferably metal casings and that, once associated with each other, form a resulting metal casing delimiting a closed volume inside which the food is to be cooked under steam pressure.

Figure 16:
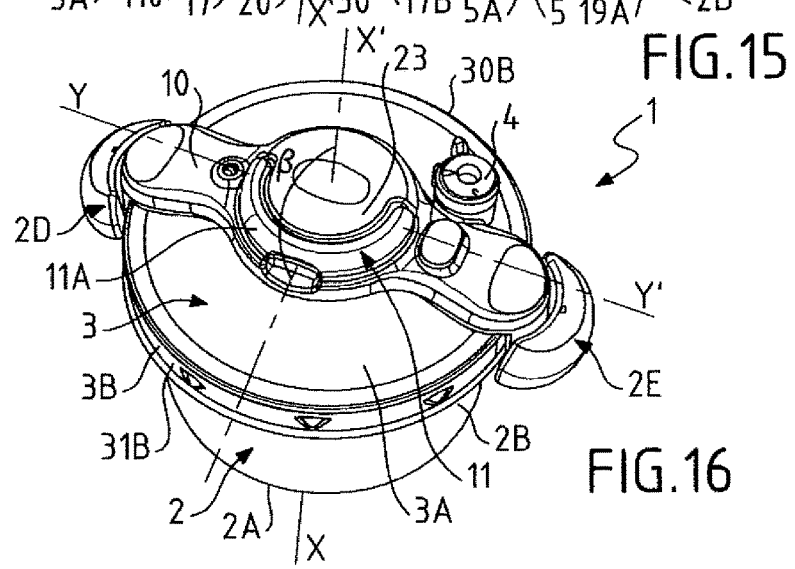
FIG. 16 is a diagrammatic perspective view of the pressure cooker of FIG. 1, with the lid subassembly in the locking configuration, so that the lid is locked relative to the vessel, the control member being lowered towards the lid in a retracted position corresponding to said locking.
Figure 17:
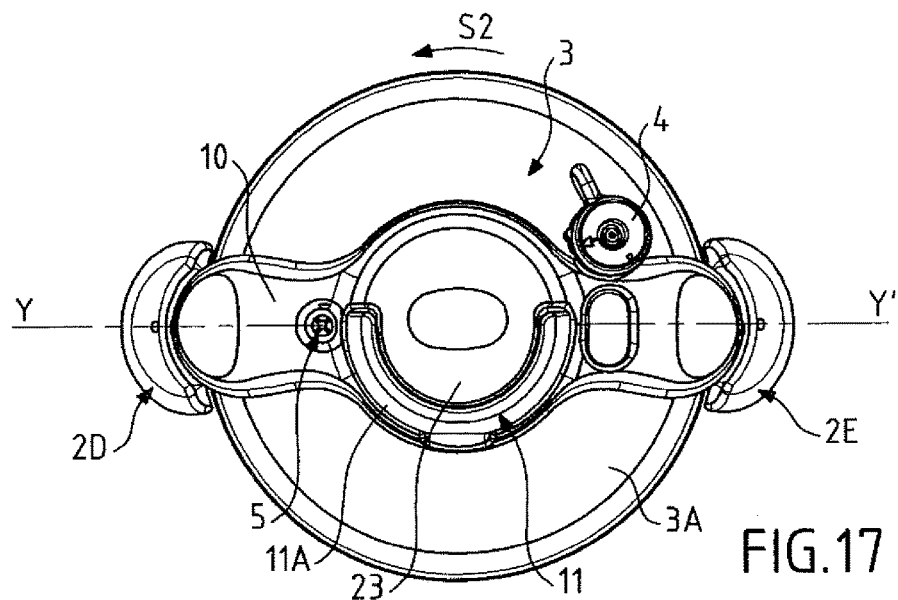
FIG. 17 is a view from above of the pressure cooker of FIG. 16.
Figure 18:
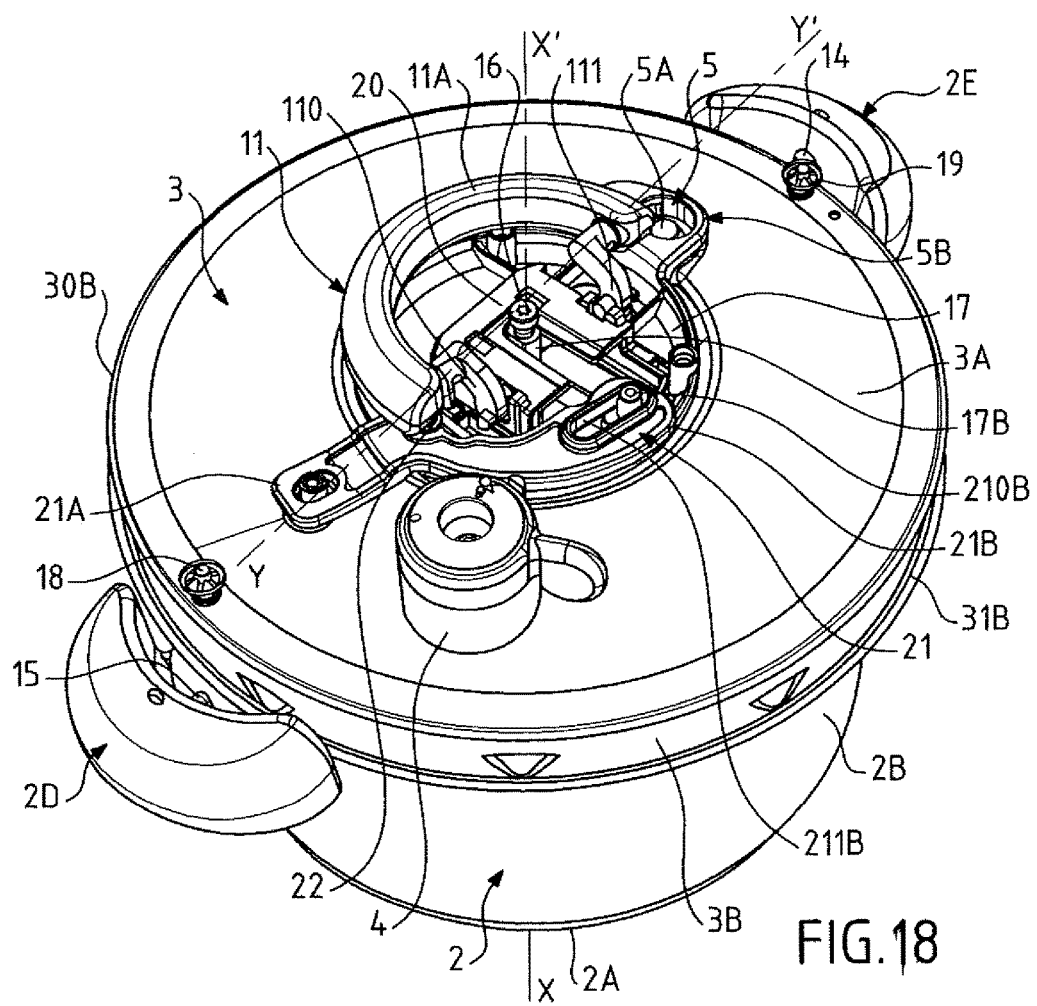
FIGS. 18 to 21 are views analogous respectively to the views of FIGS. 5, 8, 9, and 10, except that the control member is in its retracted position corresponding to the lid being locked.
Figure 19:
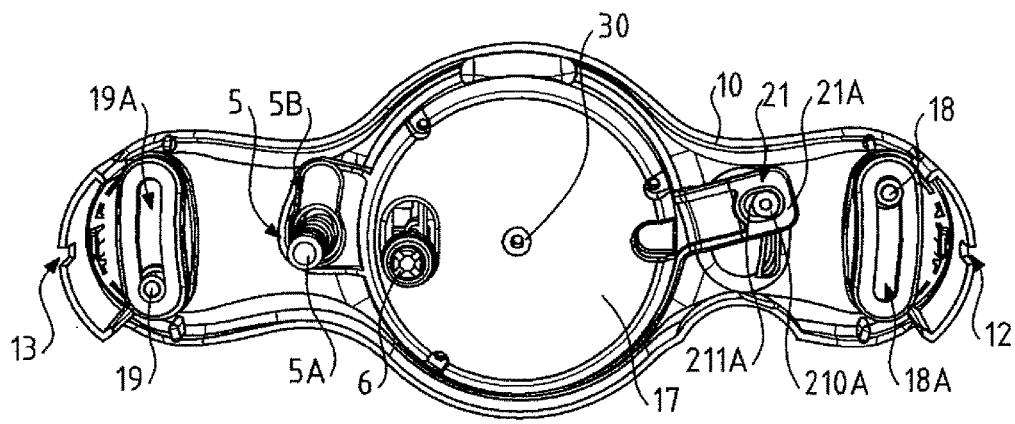
Figure 20:
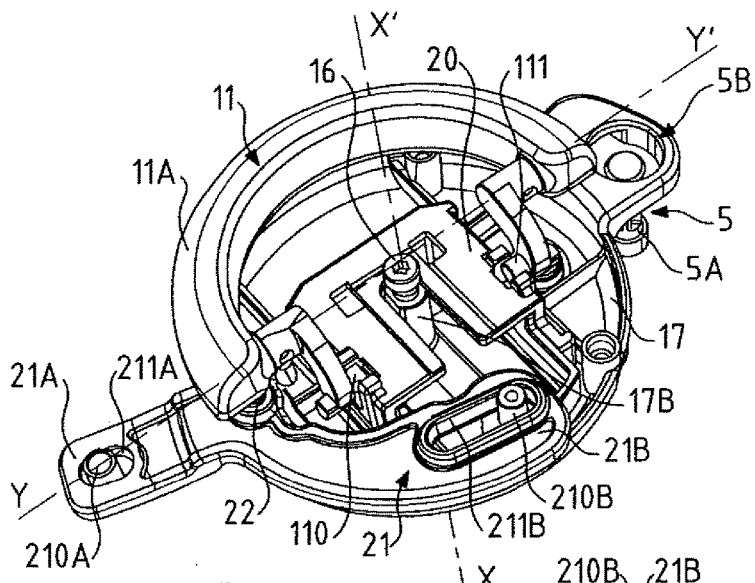
Figure 21:
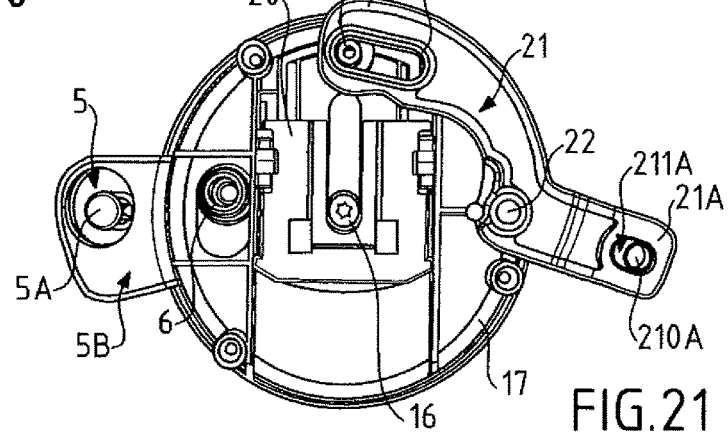

The utensil 1 of the invention also includes a bayonet-fitting locking system, in order to enable the cooking enclosure formed by the association of the lid 3 and of the vessel 2 to reach at least the above-mentioned operating pressure without any risk of the lid 3 coming off under the effect of the pressure prevailing inside the enclosure. In other words, the locking system is designed to provide a mechanical coupling between the vessel 2 and the lid 3 that is sufficiently robust to prevent the lid 3 from separating from the vessel 2 under the effect of pressure building up inside the cooking enclosure. More precisely, said bayonet-fitting locking system is designed to lock and to unlock the lid 3 relative to the vessel 2 by pivoting the lid 3 relative to the vessel 2, in this example about said central vertical axis X-X', so as thus to cause the utensil 1 to go from a ready-for-locking configuration, in which the lid 3 is mounted on the vessel 2 and is resting freely on said vessel 2 (FIGS. 1 and 3), to a locking configuration in which the vessel 2 and the lid 3 interact to prevent them from being separated freely (FIGS. 16 and 17), and vice versa. Thus, in the embodiment shown in the figures, the utensil 1 goes from its ready-for-locking configuration to its locking configuration by the lid 3 being turned relative to the vessel 2 in a clockwise direction S1 over a predetermined angular stroke about the central axis X-X', and goes from its locking configuration to its ready-for-locking configuration by the lid 3 being turned relative to the vessel 2 in a counterclockwise opposite direction S2 over said predetermined angular stroke about the central axis X-X' (FIGS. 3 and 17), it being understood that the reverse is quite possible without going beyond the ambit of the invention (S1 then being the counterclockwise direction and S2 being the clockwise direction). For this purpose, the bayonet-fitting locking system of the cooking utensil 1 advantageously includes first and second series of projections 7A-7J, 8A-8J that are integral respectively with the lid 3 and with the vessel 2, and that, in order to lock and unlock the lid 3 relative to the vessel 2, are designed to come to engage and to disengage mutually by the lid 3 being turned relative to the vessel 2 about the central vertical axis X-X' over said predetermined angular stroke. As is well known per se, the projections 7A-7J, 8A-8J of each of the first and second series are designed to co-operate in pairs, i.e. each of the projections of one of said series is brought, by the lid 3 being turned relative to the vessel 2, to go under a corresponding projection of the other series to lock the lid 3 relative to the vessel 2. In the embodiment shown in the figures, the projections 7A-7J of the first series, integral with the lid 3, project radially inwards from the lid 3, while the projections 8A-8J of the second series, integral with the vessel 2, project radially from the outside face of the side wall 2B of the vessel 2, outwards from said vessel 2. However, it is quite possible for the locking projections 7A-7J on the lid to project outwards from the lid 3 and for the vessel projections 8A-8J to project radially inwards from the vessel. The invention is therefore not limited to a particular configuration of the locking ramps of the bayonet-fitting locking system, the essential requirement being that lid projections 7A-7J and the vessel projections 8A-8J respectively form lid ramps and vessel ramps that co-operate mutually by the vessel 2 and the lid 3 being turned relative to each other, in this example about the central vertical axis X-X', so that the lid ramps come to be positioned under the vessel ramps in order to form a mechanical coupling between the vessel 2 and the lid 3 that is capable of withstanding the internal pressure prevailing inside the cooking enclosure. In the example shown in the figures, each of the lid projections 7A-7J is constituted by a three-dimensional (3D) element obtained by local 3D deformation of the material of which the casing of the lid 3 is made, and, more precisely, of which the annular band 3B is made, along which band the projections 7A-7J are preferably disposed, optionally at regular intervals. Each projection thus forms a protuberance that is formed integrally with the annular band 3B and that projects from said annular band while defining, on one side, a convex inside face, and, on the other side, as a "negative", an opposite concave outside face corresponding, for example, to the imprint due to application of a forming tool, and preferably of a die-stamping tool. However, the invention is absolutely not limited to implementation of specific projections 7A-7J, and in particular projections obtained by die-stamping as in the example shown in the figures. It is, for example, quite possible for the lid projections 7A-7J to be formed by flat tongues obtained by localized inward folding-over of the free edge 31B of the annular band 3B of the lid 3. However, the use of a 3D element is preferred because it makes it easy, merely by deforming material (by die-stamping or some other technique), to obtain a projection that has excellent mechanical properties and small dimensions. By means of such small dimensions, it is possible to cause the utensil 1 to go from the ready-for locking configuration (pre-locking configuration) to the locking configuration by the lid 3 and the vessel 2 being turned relative to each other through a relatively small angle, e.g. an angle less than 30°, it being understood that the invention is not limited to any particular angle, which may be greater than or equal to 30°, or, conversely, considerably less than 30°, e.g. lying in the range 10° to 25°. In the example shown in the figures, the vessel projections 8A-8J are formed by an annular rim that projects outwards beyond and from the free top edge 2C, notches 9A-9J being provided through said annular rim in such a manner as to allow said lid projections 7A-7J to pass through, so that the portions of said annular rim that extend between each notch 9A-9J form respective vessel ramps designed to co-operate with the lid projections 7A-7J that form the lid ramps. Thus, when the lid 3 comes to fit over the top of the vessel 2, the lid projections 7A-7J can pass through the notches 9A-9J so as to be situated lower than the annular rim. The utensil 1 is then in its pre-locking configuration (also referred to as the "ready-for-locking" configuration), from which the locking configuration can be reached merely by turning the lid 3 relative to the vessel 2 about the vertical axis X-X', thereby causing the projections 7A-7J of the lid 3 and the notches 9A-9J of the annular rim to be shifted angularly to achieve locking of the "bayonet-fittings" type. Preferably, in the embodiment shown in the figures, the lid projections 7A-7B are located on the annular band 3B of the lid 3 at some distance from the free second circular edge 31B of said annular band 3B, in such a manner that, below said 3D elements, the annular band 3B forms a self-centering skirt for self-centering the lid 3 relative to the vessel 2. In co-operation with the side rim that is almost continuous (except for the notches 9A-9J) and that forms the vessel ramps, this annular skirt enables the lid 3 to be positioned naturally and spontaneously in a manner such that it is centered relative to the vessel 2 when it is placed on it.

Figure 6:
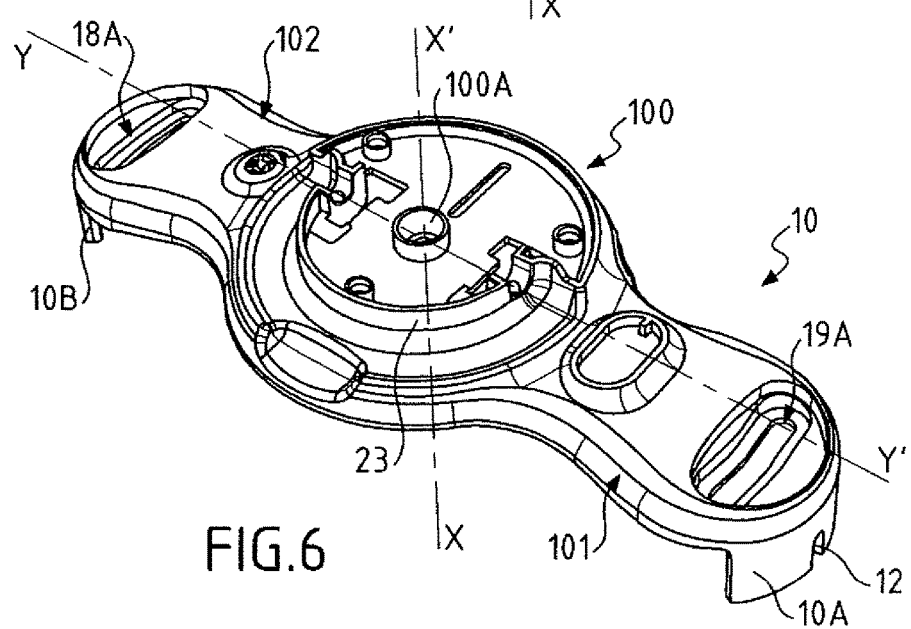
FIG. 6 is a diagrammatic perspective view of a part made of a plastics material and forming the support omitted in FIG. 5.
Figure 7:
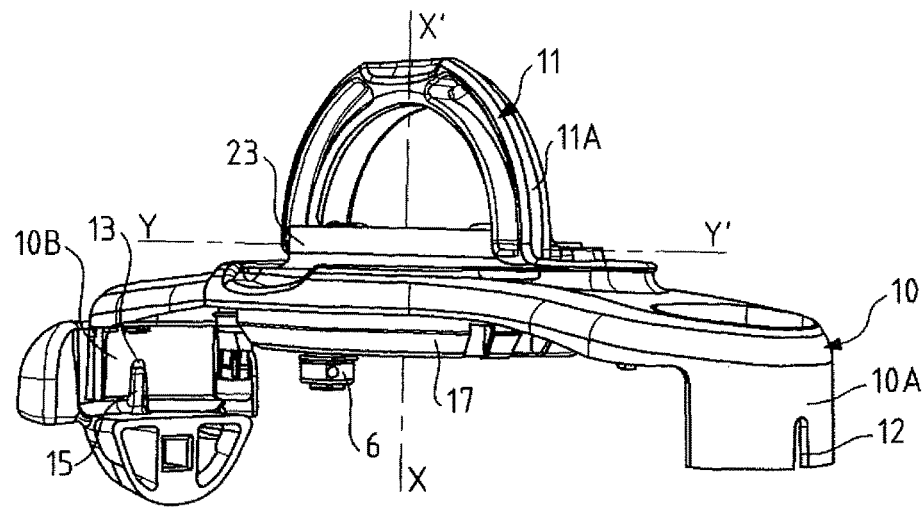
FIG. 7 is a diagrammatic perspective view of a design detail of the pressure cooker of FIGS. 1 to 6, making it possible, in particular, to see the co-operation between the support and the vessel handle for locking the relative angular position of the lid subassembly and of the vessel in a horizontal plane when said lid subassembly and said vessel are united in said pre-locking predetermined relative arrangement.
Figure 8:
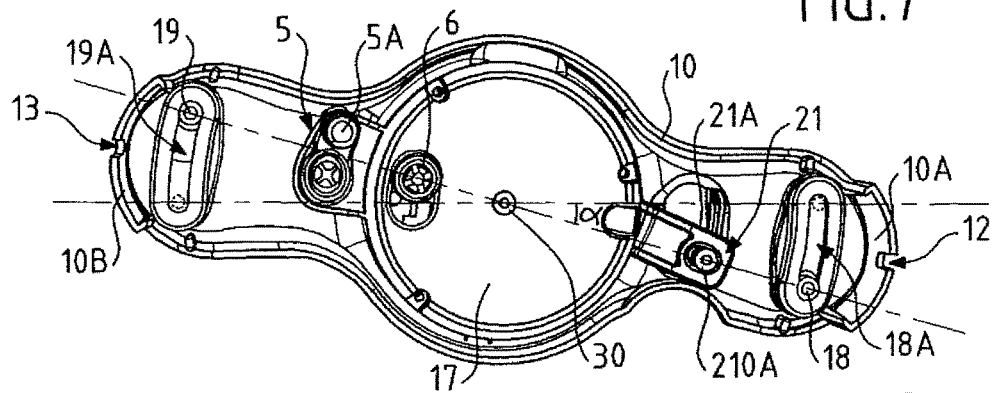
FIG. 8 is a view from below showing the design detail of FIG. 7, except that the vessel handle has been omitted.
Figure 9:
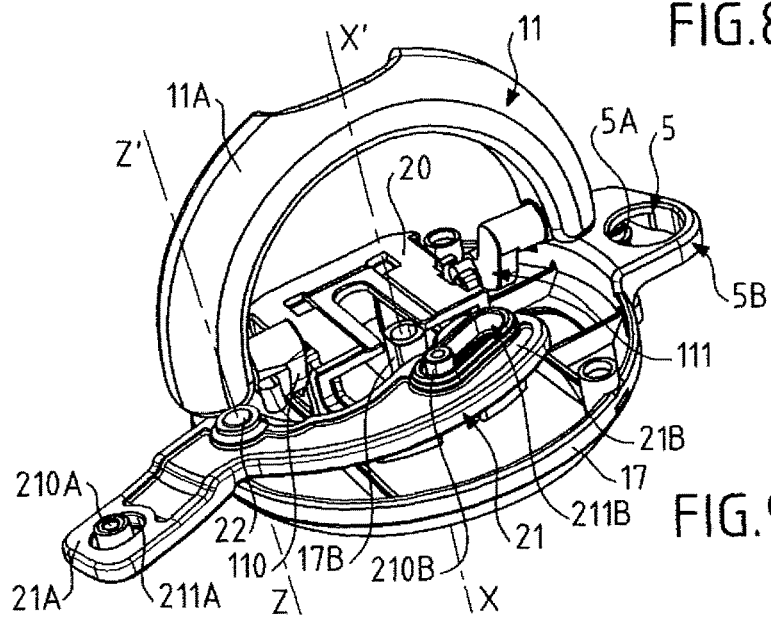
FIG. 9 is a diagrammatic perspective view of an embodiment detail of the pressure cooker of FIGS. 1 to 8, more precisely relating to the control member for controlling locking/unlocking and to the transformation device for transforming the movement of the control member into pivoting of the lid relative to the support.
Figure 14:
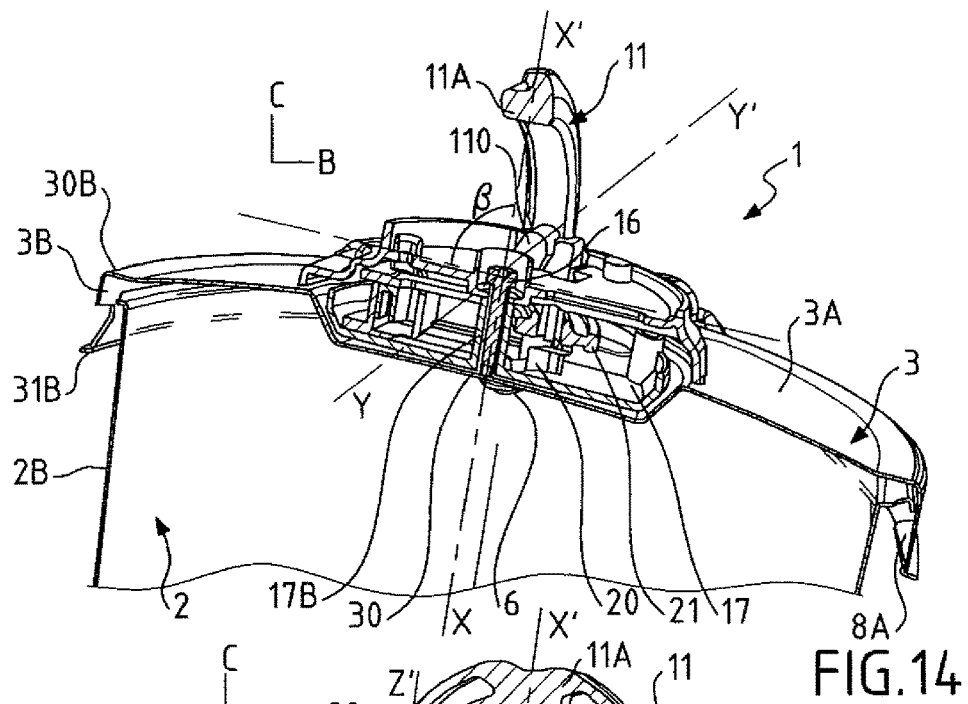
FIG. 14 is a section view on the section plane B-C through the pressure cooker of FIG. 1.
Figure 15:
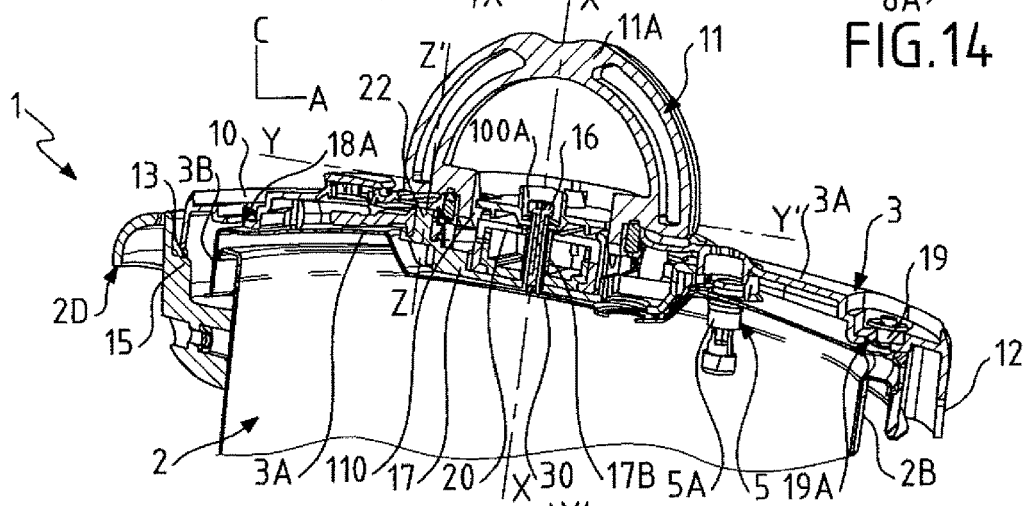
FIG. 15 is a section view on the section plane A-C through the pressure cooker of FIG. 1.

In accordance with the invention, the utensil 1 includes a lid subassembly (shown separately in FIG. 4) which includes both the lid 3 and a support 10 attached to said lid 3, permanently in this example, in such a manner that said lid can pivot relative to said support 10, preferably between two positions corresponding respectively, in this example, to an unlocking configuration and to a locking configuration of said lid subassembly. The two positions between which the lid 3 can pivot relative to the support 10 are advantageously separated by a predetermined angular stroke corresponding to the stroke required to cause the utensil 1 to go from its pre-locking configuration (ready-for-locking configuration) shown in FIG. 1 to its locking configuration shown, for example, in FIG. 16. The lid subassembly thus forms an independent single unit that is designed to be associated with the vessel subassembly (formed by the vessel 2 itself and by the vessel handles 2D, 2E) to form the cooking enclosure. In the embodiment shown in the figures, the lid 3 is thus mounted to pivot relative to said support 10 about the central vertical axis X-X'. This pivot coupling between the lid 3 and the support 10 may be formed by any means known to the person skilled in the art. Advantageously, the support 10 is in the form of a crosspiece, i.e. in the form of a substantially elongate part that extends diametrically over the lid 3 and that is extended, in this example, at each of its ends by a respective dropped edge 10A, 10B. Preferably, the crosspiece in question has a larger central zone 100, e.g. that is circular in general shape, extended on either side by first and second arms 101, 102 that themselves are terminated by respective ones of said dropped edges 10A, 10B. The central portion 100 is advantageously provided with a central orifice 100A through which a pin 30 fastened to the lid 3 is designed to extend, at the center of said lid, about which pin the support 10 is designed to turn about the central vertical axis X-X'. For example, the pin 30 is welded to the lid 3 in such a manner as to extend vertically from the center of said lid, and thus to be capable of being inserted into said orifice 100A. Preferably, the pin 30 is provided with a tapped recess designed to co-operate with a screw 16 in order to fasten the support 10 to the lid 3 while also enabling the lid 3 to pivot about the pin 30. Advantageously, in addition to the part in the form of a crosspiece shown in FIG. 6, the support 10 also includes a plate 17 that is of circular general shape substantially complementary to the shape of the central portion 100 of the crosspiece and that is designed to be interposed between said crosspiece and the top face of the lid 3 to form a housing designed to receive at least in part a control mechanism for causing the lid 3 to pivot relative to the support 10. For example, in the embodiment shown in the figures, the plate 17 is in the form of a dish made of a plastics material and provided with a central orifice 17A, which is extended via a vertical cylindrical tube in which the pin 30 is designed to be inserted. The crosspiece that can be seen in FIG. 6 is itself designed to be fastened (e.g. by means of a plurality of screws) permanently to the plate 17, in order to co-operate with said plate to form a single-unit, one-piece crosspiece subassembly that is held on the lid 3 by means of the coupling between the pin 30 and the screw 16, which coupling allows the lid 3 to pivot relative to the above-mentioned crosspiece subassembly that, in this example forms the support 10.

As explained above, the lid 3 is designed to pivot relative to the support 10 between two positions, namely a first position (corresponding to locking), and a second position (corresponding to unlocking), the two positions being separated by a predetermined angular stroke. Preferably, the first position and/or the second position is a stable position/are stable positions. It is however quite possible for one or the other of said first and second positions to be unstable, so that whenever the lid 3 moves away from one and/or the other of said first and second positions, it is automatically urged back into the other position (e.g. by a spring). Advantageously, the first position and/or the second position is an abutment position/are abutment positions. For example, in the embodiment shown in the figures, the utensil 1 is provided with at least one guide stud 18, and preferably with two guide studs 18, 19 that are disposed diametrically opposite each other about the central axis X-X' and attached to the lid 3 permanently (e.g. by being welded to said lid in such manner as to extend vertically upwards from the outside surface of said lid 3, and, in this example, at the periphery of said lid, as shown in the figures). Each of said guide studs 18, 19 is designed to slide in a complementary elongate guide groove 18A, 19A provided in the support 10, e.g. towards each end of said support 10. The length of each groove 18A, 19A is adapted, in this example, to the angular stroke of the lid 3 relative to the support 10. Each stud 18, 19 is also provided with a head of larger cross-section that co-operates with the edges of the corresponding groove 18A, 19A to retain the support 10 vertically and to prevent it from moving vertically away from the lid 3.

In accordance with the invention, the lid subassembly in the unlocking configuration and the vessel 2 are designed to be united in at least one predetermined relative arrangement (shown, for example, in FIGS. 1 and 3) enabling said bayonet-fitting locking system to lock the lid 3 relative to the vessel 2 by the lid 3 being pivoted in order to cause the lid subassembly to go from its unlocking configuration to its locking configuration. In other words, when the lid subassembly is in the unlocking configuration, the lid 3 and the support 10 are positioned relative to each other in such a manner that the support 10 being docked onto the vessel 2 in a predetermined position, corresponding to said predetermined relative arrangement, makes it possible to cause the lid ramps 7A-7J to go below the vessel ramps 8A-8J through the notches 9A-9J separating said vessel ramps, the lid subassembly then fitting over the top of the vessel 2 in a ready position, from which it suffices to cause the lid 3 to pivot relative to the vessel 2 in order to lock the lid 3 relative to the vessel 2. Thus, once the vessel 2 and the lid subassembly in the unlocking configuration are united in the pre-locking predetermined relative arrangement shown in FIG. 1, it suffices to maintain the support 10 in position relative to the vessel 2 and to cause the lid 3 to pivot relative to the support 10 over the above-mentioned predetermined angular stroke in order to bring the lid ramps 7A-7J into correspondence with the vessel ramps 8A-8J, under said vessel ramps, thereby locking the lid 3 relative to the vessel 2.

The utensil 1 also includes a control member 11 for controlling the locking/unlocking, which control member is designed, in this example, to be capable of being manipulated by the user in such a manner as to enable the user to control the bayonet-fitting locking system in order thus advantageously, by manually acting on the control member 11, to cause the lid subassembly to go from its locking configuration to its unlocking configuration and vice versa, in order thus to be able to cause the utensil 1 to go from its pre-locking configuration (also referred to as the "ready-for-locking" configuration—shown in FIG. 1) to its locking configuration (shown in FIG. 16), and vice versa. The control member 11 is attached to the support 10, permanently in this example, in such a manner as to be capable of being moved relative to said support between a locking position (FIG. 16) and an unlocking position (FIG. 1). In other words, the control member 11 is advantageously fastened permanently to the support 10 while also retaining the possibility of moving relative to said support, so that a user can manually cause the control member 11 to move relative to the support 10 from the unlocking position to the locking position and vice versa.

In accordance with the invention, the utensil 1 also includes a transformation device for transforming said movement of the control member 11 into pivoting of the lid 3 relative to the support 10, so that said locking and unlocking positions of the control member 11 correspond respectively to said locking and unlocking configurations of the lid subassembly. The user can thus cause the lid subassembly to go from its unlocking configuration to is locking configuration, and vice versa, by manually moving the control member 11 relative to the support 10 from its unlocking position to its locking position, and vice versa. The transformation device, which can be seen, in particular, in FIGS. 5, 9 to 13, 18, 20, and 21, is thus designed to convert the movement of the control member 11 relative to the support 10 into movement in rotation of the lid 3 relative to said support 10, in this example about said central vertical axis X-X', so that the user can thus cause the locking/unlocking to take place by causing the lid 3 to pivot relative to the support 10 merely by manipulating the control member 11, once the lid 3 has been mounted on the vessel 2 with the lid ramps disposed below the vessel ramps. Naturally, the above-mentioned transformation device is designed as a function of the type of movement of the control member 11 relative to the support 10, and can implement any required drive component (toothed wheel, cam, lever, connection rod, etc.).

Advantageously, the support 10 and the vessel 2 are designed to interact, directly or indirectly, whenever the lid subassembly in the unlocking configuration and the vessel 2 are united in said predetermined relative arrangement, in order substantially to prevent the support 10 from being able to pivot relative to the vessel 2 (in this example about said central vertical axis X-X') when the control member 11 is moved from its locking position to its unlocking position (or vice versa). In other words, the lid subassembly in the unlocking configuration and the vessel 2 being united in the predetermined relative arrangement (pre-locking arrangement) shown in FIG. 1 causes the support 10 and the vessel 2 to be interlocked, thereby, in this example, preventing the support 10 from turning about the central axis X-X' while also resting on the vessel 2. This locking of the relative angular position of the support 10 and of the vessel 2 enables the support 10 to act as a stationary structure that is stationary relative to the vessel 2 and relative to which the lid 3 can pivot about the central vertical axis X-X' over a predetermined angular stroke so as to go from an unlocked state (shown in FIG. 1) to a locked state (shown in FIG. 16). Preferably, said support 10 and said vessel 2 are provided with respective support shaped portions 12, 13 and vessel shaped portions 14, 15 that are mutually complementary and that are designed to co-operate by interfitting engagement when the lid subassembly in the locking configuration and the vessel 2 are united in said predetermined relative arrangement to form the cooking enclosure (FIG. 1). Said interfitting engagement of the complementary support shaped portions 12, 13 and vessel shaped portions 14, 15 makes it possible to lock the relative angular position of the support 10 and of the vessel 2 in a horizontal plane perpendicular to said central vertical axis X-X'. In the embodiment shown in the figures, the vessel 2 is provided with two vessel shaped portions 14, 15 disposed diametrically opposite each other about the central vertical axis X-X' and fastened to the outside face of the side wall 2B of the vessel 2, while the support 10 is provided with two complementary shaped portions 12, 13 disposed diametrically opposite each other on the lid 3 about the central vertical axis X-X', said support shaped portions 12, 13 being, in this example, disposed facing the outside face of the annular band 3B of the lid 3. It is however quite possible, without going beyond the ambit of the invention, for said support 10 and said vessel 2 to be provided respectively with a single support shaped portion and with a single vessel shaped portion, or indeed, rather than having respective support and vessel shaped portions designed to co-operate by interfitting engagement, for the support 10 and the vessel 2 to be provided with interlocking elements of some other type based on implementing force co-operation (by friction, clipping, meshing, magnetic attraction, etc.) sufficient for locking the relative angular position of the support 10 and of the vessel 2. Advantageously, each vessel shaped portion 14, 15 forms a male element while each support shaped portion 12, 13 forms a female element complementary to said male element, said male element being advantageously designed to be inserted in said female element to establish a coupling preventing the support 10 and the vessel 2 from moving in rotation relative to each other about the central vertical axis X-X'. However, it is quite possible, without going beyond the ambit of the invention, for each vessel shaped portion 14, 15 to form a female element while each support shaped portion 12, 13 forms a male element. Advantageously, said vessel shaped portion 14, 15 is carried by said vessel handle 2D, 2E. Thus, in the embodiment shown in the figures, each vessel handle 2D, 2E, fastened permanently to the side wall 2B of the vessel 2, incorporates a respective vessel shaped portion 14, 15, which, for example, is in the form of a rib that forms a male element. As described above, the support 10 is advantageously in the form of a crosspiece that extends over the lid 3 (while being connected to said lid via a pivot coupling) and that is extended at its ends by respective vertical dropped edges 10A, 10B that project radially beyond the lid 3 and extend substantially parallel to the annular band 3B, outside said band. A notch is advantageously provided in the free bottom edge of each of said dropped edges 10A, 10B of the support 10 to form a female element that is complementary to the rib preferably forming the male element. Each of said dropped edges 10A, 10B is also advantageously designed to come to be inserted in a recess of complementary shape provided between the corresponding handle 2D, 2E and the vessel 2, in such a manner as to guide the lid 3 on its downward vertical path relative to the vessel 2 when the lid subassembly in the unlocking configuration is mounted on the vessel 2 by the user to unite said lid subassembly in the unlocking configuration and said vessel 2 in said predetermined relative arrangement.

In accordance with the invention, said control member 11 is shaped to be capable of being taken hold of manually in order to enable said lid subassembly to be manipulated via it. In other words, the control member 11 is designed to form graspable means designed to be taken hold of, preferably with one hand, by a user, to transport and lift the lid subassembly, with a view, for example, to mounting it on the vessel 2. Preferably, the control member 11 forms the only graspable member available for taking hold of the lid subassembly, i.e. the utensil 1 is provided with a graspable member for enabling the lid subassembly to be taken hold of that is solely and exclusively formed by the control member 11. Thus, the control member 11 provides two functions, namely a graspable member function, enabling the user to take hold of the lid subassembly via it for the purposes of lifting said lid subassembly and moving it, e.g. with a view to mounting it on the vessel 2, or, conversely with a view to separating it from the vessel 2, and a control function for controlling locking/unlocking by controlling the pivoting of the lid 3 relative to the support 10.

In accordance with the invention, the control member 11 is connected mechanically to said support 10 so that any manual lifting, via the control member 11, of said lid subassembly against the weight of said lid subassembly causes the control member 11 to be urged back into its unlocking position under the effect of the weight of the lid subassembly. In other words, the mechanical coupling connecting the control member 11 to the support 10 is designed to enable the control member 11 to reach its unlocking position spontaneously, or to remain in said unlocking position, when a reaction force is exerted on the control member 11 in reaction to the weight of the lid subassembly. By means of this technical characteristic, the lid subassembly is urged back into and maintained naturally and spontaneously in its unlocking configuration when the user lifts the lid subassembly via the control member 11, as used as a graspable handle for taking hold of said lid subassembly. Thus, when the user mounts the lid subassembly on the vessel 2 while causing the support shaped portions 12, 13 and the vessel shaped portions 14, 15 to co-operate mutually, the lid subassembly naturally and spontaneously finds itself in the unlocking configuration, thereby making it easy to reach the pre-locking predetermined relative arrangement shown in FIG. 1. The mechanical coupling between the control member 11 and the support 10 thus makes it possible to cause the control member 11 to go from its locking position to its unlocking position merely by lifting the lid subassembly against its weight, via the control member 11, and then to maintain the control member 11 in its unlocking position so long as the lid subassembly remains lifted against its weight via the control member 11.

Naturally, different possibilities exist for mechanically connecting the control member 11 to the support 10 in order to obtain the desired return function for urging the control member 11 back into its unlocking position under the effect of the weight of the lid subassembly. Advantageously, the mechanical coupling connecting the control member 11 to the support 10 is designed so that manually moving the control member 11 relative to the support 10 is formed by at least (i) a movement in rotation of the control member 11 about an axis of rotation Y-Y' parallel to a direction intersecting the central vertical axis X-X', e.g. a radial direction, and/or by at least (ii) a movement in translation of the control member 11, e.g. in a vertical plane parallel to said central vertical axis X-X'. Implementing manually moving the control member 11 as in one and/or the other of the two preferred possibilities (i) and (ii) described above avoids any risk of the vessel 2 being driven in rotation in untimely manner about the axis X-X' when the control member 11 is moved manually relative to the support 10, while the utensil 1 is in the pre-locking configuration (configuration shown in FIG. 1, in which the support 10 and the vessel 2 interact to lock the relative angular position of the support 10 and of the vessel 2). Indeed, the invention makes it possible to guarantee that the user can lock the lid 3 relative to the vessel 2 using one hand only, merely by manipulating the control member 11, without it being necessary to hold the vessel 2 stationary with the other hand, regardless of any friction effects that might exist due, in particular, to the annular sealing gasket being interposed between the vessel 2 and the lid 3. In addition, implementing movement of the control member 11 as in one or the other of the two above-described preferred possibilities (i) and (ii) lends itself particularly well to obtaining a return whereby the control member 11 is urged back into its unlocking position under the effect of the weight of the lid subassembly.

Advantageously, said control member 11 is connected mechanically to the support 10 so that moving said control member 11 from its unlocking position to its locking position (and vice versa) is formed by at least a movement in rotation of the control member 11 about an axis of rotation Y-Y' parallel to a direction intersecting the central vertical axis X-X' and/or by at least a movement in translation of the control member 11. For example, the control member 11 may be mounted to move in rotation only, about an axis of rotation that extends in a direction intersecting the direction of the central vertical axis X-X', and even more preferably about an axis of rotation intersecting the central vertical axis X-X', or alternatively, said control member 11 may be mounted to move in translation relative to the support 10, e.g. to slide vertically (preferably along an axis of sliding that coincides with the central vertical axis X-X') relative to said support 10, or indeed be connected to the support 10 via a mechanical coupling combining a movement in translation and a movement in rotation (e.g. a helical coupling of axis X-X'). The control member 11 may thus be in the form of a rotary element of the handle or knob, lever, control stick, looped handle or other type and/or in the form of a slidably mounted element such as a push button, a slider, etc. In the preferred embodiment shown in the figures, the control member 11 is mounted to pivot relative to said support 10 about a radial axis of pivoting Y-Y' that is perpendicular to the central vertical axis X-X', and that intersects said central vertical axis. Such a pivot coupling for pivoting about a radial axis Y-Y' causes the control member 11 to move relative to the support 10 in a movement that is formed by a movement in rotation only, about an axis Y-Y' that is perpendicular to the axis of pivoting X-X' of the lid 3 relative to the support 10, thereby avoiding any untimely movement in rotation of the vessel 2. Such a movement in rotation is also particularly ergonomic and intuitive. Above all, such a movement in rotation lends itself particularly well to obtaining the desired return function for urging the control member 11 back into its unlocking position under the effect of the weight of the lid subassembly. Under the effect of a holding and retaining force exerted on the control member 11 in opposition to the weight of the lid subassembly, the control member 11 tends naturally to pivot until it is once again in an equilibrium vertical position in which it crosses the central vertical axis X-X'. In the preferred example shown in the figures, each vessel handle 2D, 2E extends outwards from said vessel 2 in a radial direction that is substantially parallel to said radial axis Y-Y' of said pivot coupling interconnecting the control member 11 and the support 10. Such a configuration, in which the vessel handles 2D, 2E are aligned with the axis of rotation Y-Y' of the control member 11 relative to the support 10 is particularly practical and ergonomic. However, it is quite possible, without going beyond the ambit of the invention, for the mechanical coupling between the control member 11 and the support 10 to be a pivot coupling of radial axis that is perpendicular both to the central vertical axis X-X' and to the radial direction in which said vessel handles 2D, 2E extend.

Advantageously, said transformation device includes a gearing mechanism designed to drive the lid 3 in rotation about said central vertical axis X-X' over a stroke having a first predetermined angular amplitude $\alpha$, in response to said control member 11 being moved in rotation about said radial axis Y-Y' over a stroke having a second predetermined angular amplitude $\beta$ that is greater than said first predetermined angular amplitude $\alpha$. For example, the control member 11 is designed to pivot about said radial axis Y-Y' between a raised position (corresponding to unlocking) and a lowered position (corresponding to locking) that are separated by a stroke having a predetermined angular amplitude $\beta$ of about 90°, while, in response to the control member 11 moving relative to the support 10 though an angle of about 90°, the lid 3 pivots relative to the support 10 over a stroke having a predetermined angular amplitude $\alpha$ of about 15°. Such a gearing mechanism thus makes it possible to differentiate clearly between the positions of the control member 11 that correspond respectively to locking and to unlocking, and to reduce the forces exerted by the user for causing the cooking utensil 1 to go from its ready-for-locking configuration to its locked configuration. Naturally, a multitude of technical possibilities exist for obtaining such a gearing effect, and the invention is not limited to any particular gearing mechanism. Indeed, the invention is not limited to having a gearing mechanism at all, and, for example, it is quite possible, without going beyond the ambit of the invention, for the transformation device to enable the first and second predetermined angular amplitudes $\alpha$, $\beta$ to be substantially equal to each other, or, conversely, the second predetermined angular amplitude $\beta$ to be less than the first predetermined angular amplitude $\alpha$, depending on the ergonomics and on the functions that are desired.

In the embodiment shown in the figures, the transformation device includes a transmission part 20 mounted to move in translation in a horizontal plane perpendicular to said central vertical axis X-X' relative to said support 10. The transmission part 20 is thus mounted to slide relative to the support 10, e.g. inside the housing provided between the plate 17 and the central portion 100 that fits over said plate 17. In this embodiment, the transformation device comprises a mechanism for transforming the pivoting movement of the control member 11 relative to the support 10 into a movement in translation of said transformation piece 20 relative to said support 10. For example, the transformation mechanism in question is formed by a cam 110, 111 integral with or secured to the control member 11, said cam 110, 111 being provided with a stud that is received in a corresponding recess provided in the transmission part 20, in such a manner that pivoting of the control member 11 causes concomitant pivoting of the cam 110, 111, which then pushes back the transmission part 20 in the horizontal plane perpendicular to the central vertical axis X-X'. However, the invention is absolutely not limited to a movement transformation mechanism having a cam, and it is, for example, quite possible to use any other known movement transformation mechanism without going beyond the ambit of the invention. For example, by way of an alternative, the mechanism for transforming the pivoting of the control member 11 into movement in translation of the transmission part 20 may consist in a meshing mechanism based on co-operation between a toothed ring sector integral with or secured to the control member 11 and a rectilinear rack integral with or secured to the transmission part 20. Naturally, other mechanisms (e.g. having connection rods, worm screws, toothed-wheel meshing, etc.) are possible. Advantageously, and in the embodiment shown in the figures, the transformation device further comprises at least one horizontal lever 21 mounted to pivot relative to the support 10 about an off-center vertical axis Z-Z' that is stationary relative to said support 10, that is parallel to said central vertical axis X-X', and that is situated at a predetermined distance from said central vertical axis. Preferably, as shown in the figures, said horizontal lever 21 extends longitudinally between a first end 21A hinged to the lid 3 and a second end 21B hinged either to said control member 11 or to a transmission part (such as, for example, the above-mentioned transmission part 20) that is part of the transformation device and that is caused to move relative to the support 10 by the control member 11, e.g. as in the above-described embodiment. Preferably, the horizontal lever 21 is provided with a recess (e.g. formed by a through orifice) designed to receive a pin 22 integral with or secured to the support 10, and, for example, formed integrally with the plate 17, in such a manner as to form a pivot coupling of axis Z-Z' between the horizontal lever 21 and the support 10. Preferably, said horizontal lever 21 is mounted to pivot relative to the support 10 at a pivot point situated between said first end 21A and said second end 21B, so that the off-center vertical axis Z-Z' goes via a zone of the horizontal lever 21 that is situated at some distance both from the first end 21A and from the second end 21B. The hinging of the first end 21A relative to the lid 3 is achieved, for example, by means of a first peg 210A that is integral with or secured to the lid 3, and is, for example welded to the outside face of said lid 3 in such a manner as to extend vertically upwards from said lid. Said peg 210A is advantageously received in a first corresponding groove 211A provided at the first end 21A of the horizontal lever 21, in such a manner that said first peg 210A can both slide and turn in the first groove 211A in question.

The transformation device also advantageously includes a second peg 210B that, in this example, is integral with or secured to the transmission part 20 and is incorporated therein. Said second peg 210B is advantageously received in a complementary second groove 211B provided at the second end 21B of the horizontal lever 21, in such a manner that said second peg 210B can both slide and pivot in the second groove 211B in question. Advantageously, the horizontal lever 21 is generally sickle-shaped, with a substantially rectilinear arm that extends from the first end 21A to the point of rotation through which the off-center vertical axis Z-Z' passes, so as then to be extended by an arcuate portion to the second end 21B. The rectilinear movement in translation of the transmission part 20 in the horizontal plane is converted into movement in rotation of the lever 21 about the off-center vertical axis Z-Z', which movement in rotation is itself converted into movement in rotation of the lid 3 relative to the support 10 about the central vertical axis X-X'. However, the invention is absolutely not limited to such a movement transformation mechanism and, for example, it is quite possible, instead of a lever system as shown, to implement a system having a connection rod, a cam, or meshing inter-engagement, or any other known system, without going beyond the ambit of the invention. It is also quite possible, instead of implementing a pivotally mounted control member 11, to implement a slidably mounted control member 11.

Advantageously, and as shown in the figures, the control member 11 comprises a looped handle 11A designed to be actuated manually so as to be movable by hand by a user between two preferably stable abutment positions, corresponding respectively to locking and to unlocking. In this preferred embodiment, the control member 11 is thus in the form of an arcuate part, in the form of a loop or of an arch, advantageously designed to be suitable for being grasped firmly by a user, preferably using the whole hand to grasp it. However, the invention is not limited to implementing a looped handle for forming the control member 11, and said control member may, for example, be constituted by a lever that is substantially rectilinear, or that has a T-shaped or L-shaped profile, a rounded knob shape, a flared knob shape, etc. the shaping of which enables the user to lift the lid subassembly via it.

The control member 11 is advantageously designed so that it can be moved manually (be it in rotation and/or in translation) relative to the support 10 both in a locking direction and in an opposite unlocking direction. Thus, in this preferred embodiment, the cooking utensil 1 has a single control member 11 that enables a user to cause the lid 3 to pivot relative to the support 10 both in the clockwise direction S1 and in the counterclockwise direction S2. In which case, the above-mentioned movement transformation device is designed to transform the manual movement of the control member 11, respectively in the locking direction and in the unlocking direction, into pivoting of the lid 3 relative to the support 10 about said central vertical axis X-X' in respective opposite rotation directions.

Advantageously, as shown in the figures, the control member 11 is mounted to pivot relative to said support 10 between firstly a deployed position (FIG. 1) that forms said unlocking position, and in which said control member 11 projects vertically, in this example in register with the lid 3 towards the outside, and secondly a retracted position, which forms said locking position and in which said control member 11 is lowered towards the lid 3. In its deployed position, the control member 11 advantageously extends in a mean direction that is substantially parallel to said central vertical axis X-X', while, in its retracted position, it extends advantageously in a mean direction that is substantially perpendicular to said central vertical axis X-X', as shown in the figures. In this preferred embodiment, the control member 11 is thus retractable, enabling it to be stowed away when it is in its retracted position.

Preferably, the control member 11 is more difficult to take hold of manually when it is in its retracted position than when it is in its deployed position, thereby limiting the possibility of a user taking hold of the control member 11 so as to use it to lift and manipulate the cooking utensil 1, which could be dangerous. When the control member 11 is formed by a looped handle 11A, the lid 3 advantageously has relief 23 in its surface, the shape of the relief preferably being substantially complementary to the shape of the empty space that is delimited by said looped handle 11A and that is designed to receive the fingers of the user. In other words, the relief 23 is designed to at least partially fill the internal empty space delimited by the looped handle 11A when said handle is folded away against the lid 3. Thus, when the looped handle 11A is fully folded away against the lid 3, parallel thereto (control member 11 in the retracted position), it advantageously extends in continuity with the relief 23, thereby limiting the possibility of the user taking hold of the looped handle 11A for manipulating (i.e. lifting, transporting, etc.) the cooking utensil 1. In other words, the control member 11 is advantageously designed to be capable of being taken hold of manually for enabling the lid subassembly to be taken hold of via it only when it is in the deployed position. In the preferred embodiment shown in the figures, the utensil 1 includes a graspable member for enabling the lid 3 to be taken hold of, which member is attached to the lid 3 and is designed to be taken hold of manually in order to enable the lid 3 to be manipulated and transported via it, said graspable member in question being formed solely by the control member 11 in the deployed position.

Preferably, under the effect of the level of pressure prevailing in the cooking enclosure, the above-mentioned opening safety means 5 are suitable for going between a releasing configuration, in which they allow the lid 3 to be unlocked relative to the vessel 2, and a blocking position in which they prevent the lid 3 from being unlocked relative to the vessel 2. To this end, said safety means 5 include a moving element 5A mounted to slide on the lid 3, and, in this example, to slide vertically in a direction of sliding that is parallel to the central vertical axis X-X', between a high position (which is an abutment position) in which it is capable of co-operating with a complementary blocking element 5B carried by the support 10, in order to prevent the lid 3 from pivoting relative to the support 10, and a low position (which is also an abutment position) in which it does not interfere with the complementary element 5B, thereby allowing the lid 3 to pivot relative to the support 10. As can be seen, in particular in FIG. 12, the moving element 5A is advantageously formed by a finger designed to slide vertically inside a tube that is butt-bonded to a leakage orifice provided through the lid 3, so that, in its high position, the finger comes to close off the leakage orifice hermetically, whereas, when the finger is in its low position, steam is allowed to leak via the orifice in question. The complementary element 5B is preferably formed by a part having a stop surface 50B and a through orifice 51B. So long as the lid is in its position in which it is unlocked relative to the support 10, the blocking surface 50B is in register with the moving element 5A, in the path along which said moving element slides, in order to prevent it from reaching its high position and thus to maintain communication between the inside of the cooking enclosure and the outside, preventing any significant build-up of pressure in the enclosure. Conversely, when the lid 3 reaches its locking position, by pivoting relative to the support 10 over the above-mentioned predetermined angular stroke, the moving element 5A is then in register with the opening 51B, thereby allowing the moving element 5A o reach its sealing high position under the effect of the drive force exerted by the pressure building up inside the cooking enclosure. Once in the high position, the moving element 5A is surrounded by the edges of the orifice 51B, thereby preventing any pivoting of the lid 3 relative to the support 10 in the unlocking direction.

Operation of the cooking utensil 1 shown in the figures is described briefly below. The user firstly fills the vessel 2 shown in FIG. 2 with food for cooking, optionally placing the food some distance from the bottom of the vessel 2 in a cooking basket having gaps in it. The user then takes hold of the lid subassembly (shown in FIG. 4) via the looped handle 11A so as to lift the lid subassembly with a view to mounting it on the vessel 2 so as to close said vessel. Under the effect of the weight of the lid 3 and of the other component elements of the lid subassembly, the looped handle 11A is returned into the deployed vertical position, and is maintained in that position, thereby causing the lid subassembly to be urged back into and held in the unlocking configuration spontaneously. The user thus uses the looped handle 11A as a transport handle for mounting the lid assembly as maintained naturally in the unlocking configuration onto the vessel 2, in such a manner as to unite said lid subassembly in the unlocking configuration and said vessel 2 in said predetermined relative arrangement shown in FIG. 1, corresponding to the support shaped portions 12, 13 and the vessel shaped portions 14, 15 being in interfitting engagement. The pressure cooker 1 is then in a ready-for-locking configuration in which the lid ramps 7A-7J are lower than the vessel ramps 8A-8J and are offset angularly relative to said vessel ramps. Then the user folds away the looped handle 11A over an angular stroke β of about 90°, until it reaches an abutment folded-away position shown, in particular, in FIGS. 16 and 17. This manual movement of the looped handle 11A from its deployed position to its folded-away position concomitantly causes the lid 3 to pivot relative to the support 10 through an angle α of about 15°, thereby enabling the lid ramps 7A-7J to come into correspondence under the vessel ramps 8A-8J in a locking configuration enabling pressure to build up. At the end of the cooking cycle, and once the pressure prevailing inside the enclosure has fallen to a predetermined safety level, the user merely needs to raise the looped handle 11A in order to cause the lid 3 to pivot relative to the support 10 in the opposite direction, thereby disengaging the vessel ramps from the lid ramps, enabling the lid 3 to be separated from the vessel 2.

The invention claimed is:

1. A cooking utensil for cooking food under pressure comprising:
   a vessel;
   a lid;
   a bayonet-fitting locking system; and,
   a lid subassembly that comprises both said lid and a support attached to said lid in such a manner that said lid can pivot relative to said support between two positions corresponding respectively to an unlocking configuration and to a locking configuration of said lid subassembly, the lid subassembly in the unlocking configuration and the vessel being configured to be united in at least one predetermined relative arrangement enabling said bayonet-fitting locking system to lock the lid to the vessel by the lid being pivoted in order to cause the lid subassembly to go from its unlocking configuration to its locking configuration;

a control member for controlling the locking/unlocking, wherein said control member is attached to said support in such a manner as to be movable relative to said support between a locking position and an unlocking position; and, a transformation device for transforming the movement of the control member into pivoting of the lid relative to the support so that said locking and unlocking positions correspond respectively to said locking and unlocking configurations, said control member being shaped to be capable of being taken hold of manually in order to enable the lid subassembly to be manipulated via it, said control member being connected movably to the support so that said lid subassembly being lifted manually via the control member against the weight of said lid subassembly, causes the control member to be urged back into its unlocking position under the effect of said weight of the lid subassembly.

2. The cooking utensil for cooking food under pressure according to claim 1, wherein said support and said vessel are configured to interact, whenever the lid subassembly in the unlocking configuration and the vessel are united in said predetermined relative arrangement, to substantially prevent said support from being able to pivot relative to the vessel when the control member is moved between the unlocking and locking positions.

3. The cooking utensil for cooking food under pressure according to claim 2, wherein said support and said vessel are provided respectively with support shaped portions and with vessel shaped portions that are mutually complementary and configured to co-operate by interfitting engagement when the lid subassembly in the unlocking configuration and the vessel are united in said predetermined relative arrangement, said interfitting engagement making possible to lock the relative angular position of the support and of the vessel in a horizontal plane.

4. The cooking utensil for cooking food under pressure according to claim 3 further comprising:

at least one vessel handle that is fastened to said vessel in such a manner as to project outwards from said vessel, said vessel shaped portion being carried by said vessel handle.

5. The cooking utensil for cooking food under pressure according to claim 3, wherein each vessel shaped portion forms a male element while each support shaped portion forms a female element complementary to said male element.

6. The cooking utensil for cooking food under pressure according to claim 1, further comprising:

an opening safety means that, under the effect of the level of pressure prevailing in the utensil, are suitable for going between a releasing configuration, in which the opening safety means allow the lid to be unlocked relative to the vessel, and a blocking position in which the opening safety means prevent the lid from being unlocked relative to the vessel, said safety means comprising a moving element mounted to slide on the lid between a high position in which the moving element is capable of co-operating with a complementary blocking element carried by the support, in order to prevent the lid from pivoting relative to the support, and a low position in which the moving element does not interfere with the complementary element, thereby allowing the lid to pivot relative to the support.

7. The cooking utensil for cooking food under pressure according to claim 1, wherein said lid is mounted to pivot relative to said support about a central vertical axis, said control member being connected mechanically to the support so that moving said control member between the unlocking and locking positions is formed by at least a movement in rotation of the control member about an axis of rotation parallel to a direction intersecting the central vertical axis and/or by at least a movement in translation of the control member.

8. The cooking utensil for cooking food under pressure according to claim 7, wherein said control member is mounted to pivot relative to said support about a radial axis of pivoting that is perpendicular to said central vertical axis.

9. A cooking utensil for cooking food under pressure according to claim 4, wherein said vessel handle extends outwardly from said vessel in a radial direction that is substantially parallel to said radial axis of pivoting.

10. The cooking utensil for cooking food under pressure according to claim 8, wherein said transformation device comprises a gearing mechanism configured to drive the lid in rotation about said central vertical axis over a stroke having a first predetermined angular amplitude, in response to said control member being moved in rotation about said radial axis over a stroke having a second predetermined angular amplitude that is greater than said first predetermined angular amplitude.

11. The cooking utensil for cooking food under pressure according to claim 8, wherein said transformation device comprises:

a transmission part mounted to move in translation in a horizontal plane perpendicular to said central vertical axis relative to said support and;

a transformation mechanism for transforming the pivoting of the control member relative to said support into movement in translation of said transmission part relative to said support.

12. The cooking utensil for cooking food under pressure according to claim 8, wherein said transformation device comprises at least one horizontal lever mounted to pivot relative to the support about an off-center vertical axis that is stationary relative to said support, that is parallel to said central vertical axis, and that is situated at a predetermined distance from said central vertical axis, said horizontal lever extending longitudinally between a first end hinged to the lid and a second end hinged either to said control member or to a transmission part that is part of the transformation device and that is caused to move relative to the support by said control member.

13. The cooking utensil for cooking food under pressure according to claim 8, wherein said control member is mounted to pivot relative to said support between a deployed position that forms said unlocking position and in which said control member projects vertically, and a retracted position that forms said locking position and in which said control member is lowered towards the lid.

14. The cooking utensil for cooking food under pressure according to claim 13, further comprising:

a graspable member for enabling the lid to be taken hold of, which member is attached to the lid and is configured to be taken hold of manually in order to enable the lid to be manipulated and transported, said graspable member being formed solely by said control member in the deployed position.

15. The cooking utensil for cooking food under pressure according to claim 13, wherein when in the deployed position, said control member extends in a mean direction that is substantially parallel to said central vertical axis, whereas in the retracted position, said control member extends in a mean direction that is substantially perpendicular to said central vertical axis.

16. The cooking utensil for cooking food under pressure according to claim 1, wherein said control member comprises a looped handle.

* * * * *